US009738367B1

(12) United States Patent
Krabacher et al.

(10) Patent No.: US 9,738,367 B1
(45) Date of Patent: Aug. 22, 2017

(54) STERN DRIVES AND WATER LIFT EXHAUST SYSTEMS FOR STERN DRIVES

(71) Applicant: Brunswick Corporation, Lake Forest, IL (US)

(72) Inventors: Matthew S. Krabacher, Fond du Lac, WI (US); David J. Waldvogel, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 15/084,786

(22) Filed: Mar. 30, 2016

(51) Int. Cl.
*B63H 21/32* (2006.01)
*F01N 13/00* (2010.01)

(52) U.S. Cl.
CPC .................... *B63H 21/32* (2013.01)

(58) Field of Classification Search
CPC ....... B63H 21/32; B63H 21/34; F01N 13/004; F01N 13/04
USPC ...... 440/89 R, 89 B, 89 C, 89 D, 89 E, 89 F, 440/89 G, 89 H, 89 J
See application file for complete search history.

(56) References Cited

U.S. PATENT DOCUMENTS

| | | | |
|---|---|---|---|
| 3,296,997 A * | 1/1967 | Hoiby | F01N 3/04 181/235 |
| 4,178,873 A | 12/1979 | Bankstahl | |
| 4,773,215 A | 9/1988 | Winberg et al. | |
| 4,781,021 A | 11/1988 | Winberg | |
| 5,644,914 A * | 7/1997 | Deavers | F01N 13/004 440/88 G |
| 5,881,555 A * | 3/1999 | Jaeger | B63H 21/32 181/271 |
| 6,022,254 A | 2/2000 | Neisen | |
| 6,412,595 B1 | 7/2002 | Horak et al. | |
| 7,065,961 B1 | 6/2006 | Batten, Jr. | |
| 8,899,029 B1 | 12/2014 | Dreyer et al. | |

* cited by examiner

*Primary Examiner* — Daniel V Venne
(74) *Attorney, Agent, or Firm* — Andrus Intellectual Property Law, LLP

(57) ABSTRACT

A stern drive is for propelling a marine vessel in water. The stern drive is configured to power a propulsor located below the surface of the water. The stern drive comprises an internal combustion engine that powers a driveshaft that axially extends through a transom of the marine vessel; an exhaust manifold that conveys exhaust gas from the internal combustion engine; and an elongated exhaust conduit that redirects the exhaust gas from the exhaust manifold transversely with respect to the driveshaft. The elongated exhaust conduit conveys the exhaust gas to an upstream exhaust outlet that discharges the exhaust gas through the transom below the surface of the water and then to a downstream exhaust outlet that is spaced apart from and is located vertically higher than the upstream exhaust outlet. The elongated exhaust conduit functions as a water lift muffler during operation of the stern drive.

20 Claims, 5 Drawing Sheets

STERN DRIVES AND WATER LIFT EXHAUST SYSTEMS FOR STERN DRIVES

FIELD

The present disclosure relates to marine drives and exhaust systems for marine drives, and particularly to stern drives and exhaust systems for stern drives.

BACKGROUND

The following U.S. Patents are incorporated herein by reference in entirety:

U.S. Pat. No. 8,899,029 discloses an apparatus for marine propulsion system having first baffle that is provided with ridge having upstream radially extending side face that is extended transversely to cooling passage along top portion of exhaust conduit.

U.S. Pat. No. 7,065,961 discloses an exhaust system with moisture trap for marine propulsion engine, having an annular reservoir built integrally in wall section of exhaust conduit.

U.S. Pat. No. 6,412,595 discloses a muffler for a marine propulsion system in which an initial portion causes a downward flow of exhaust gas and entrained water from an exhaust manifold. The transition section directs the exhaust gas toward an egress section which extends upwardly from the transition section. The various sections of the exhaust path can be configured to form one or more loops which define one or more water collection regions.

U.S. Pat. No. 6,022,254 discloses an exhaust system for inboard/outboard marine propulsion system. The exhaust system includes intermediate exhaust pipes which are physically separate components than the water separator. A sealed latching mechanism connects an outlet portion of the intermediate exhaust pipes to an inlet portion of the water separator. The sealed latching mechanism is secure yet flexible, and allows the orientation of the intermediate exhaust pipe to be adjusted relative to the water separator, thus allowing the exhaust system to be installed and serviced without dismounting or loosening the engine. The intermediate exhaust pipes also have a flared inlet part to facilitate alignment of the intermediate exhaust pipe at the exhaust elbow.

U.S. Pat. No. 4,781,021 discloses a marine engine exhaust muffler assembly that includes inlet and outlet members, the axes of which are offset from each other. A muffler housing is disposed between the inlet and outlet members and forms a chamber having disposed therein an annular multi-layered cartridge, and with the layers having a multiplicity of perforations therein for passage of exhaust gases and spent engine cooling water there through. The water assists in keeping the muffler clean.

U.S. Pat. No. 4,773,215 discloses a stern drive marine propulsion system that has an inboard engine with an exhaust, an outboard drive unit operatively coupled to the engine and separated therefrom by a transom having two exhaust passages there through, and an exhaust control assembly aft of the engine exhaust and forward of the transom and within the boat. The assembly has an inlet connected to the engine exhaust, and has first and second outlets communicating with the respective exhaust passages extending aft through the transom. A valve in the assembly selectively controls communication of the inlet with the first outlet.

U.S. Pat. No. 4,178,873 discloses a marine stern drive includes an inboard engine having an exhaust passageway connected to an outboard drive unit having an exhaust passageway. A transom bracket assembly positioned between the engine and the drive unit permits vertical pivoting of the drive unit for steering and horizontal pivoting of the drive unit for steering and horizontal pivoting of the drive unit for trimming. A first exhaust pipe is connected to the inboard engine and a second exhaust pipe connecting to the drive unit. The first exhaust pipe extends outward through the transom of the boat and has an open end position centered on and adjacent the vertical pivot axis and below the vertical pivot axis. The second exhaust pipe extends towards and ends in alignment with the end position of the first exhaust pipe to form an interface which includes an opening between the pipe ends.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A stern drive is for propelling a marine vessel in water. The stern drive is configured to power a propulsor located below the surface of the water. The stern drive comprises an internal combustion engine that powers a driveshaft that axially extends through a transom of the marine vessel; an exhaust manifold that conveys exhaust gas from the internal combustion engine; and an elongated exhaust conduit that redirects the exhaust gas from the exhaust manifold transversely with respect to the driveshaft. The elongated exhaust conduit conveys the exhaust gas to an upstream exhaust outlet that discharges the exhaust gas through the transom below the surface of the water and then to a downstream exhaust outlet that is spaced apart from and is located vertically higher than the upstream exhaust outlet. The elongated exhaust conduit functions as a water lift muffler during operation of the stern drive.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

In the present description, certain terms have been used for brevity, clarity and understanding. No unnecessary limitations are to be inferred therefrom beyond the requirement of the prior art because such terms are used for descriptive purposes only and are intended to be broadly construed.

During research and experimentation, the present inventors have determined that conventional water lift mufflers for stern drives take up a relatively large amount of space between the stern drive and the transom of the marine vessel.

Figure 1:
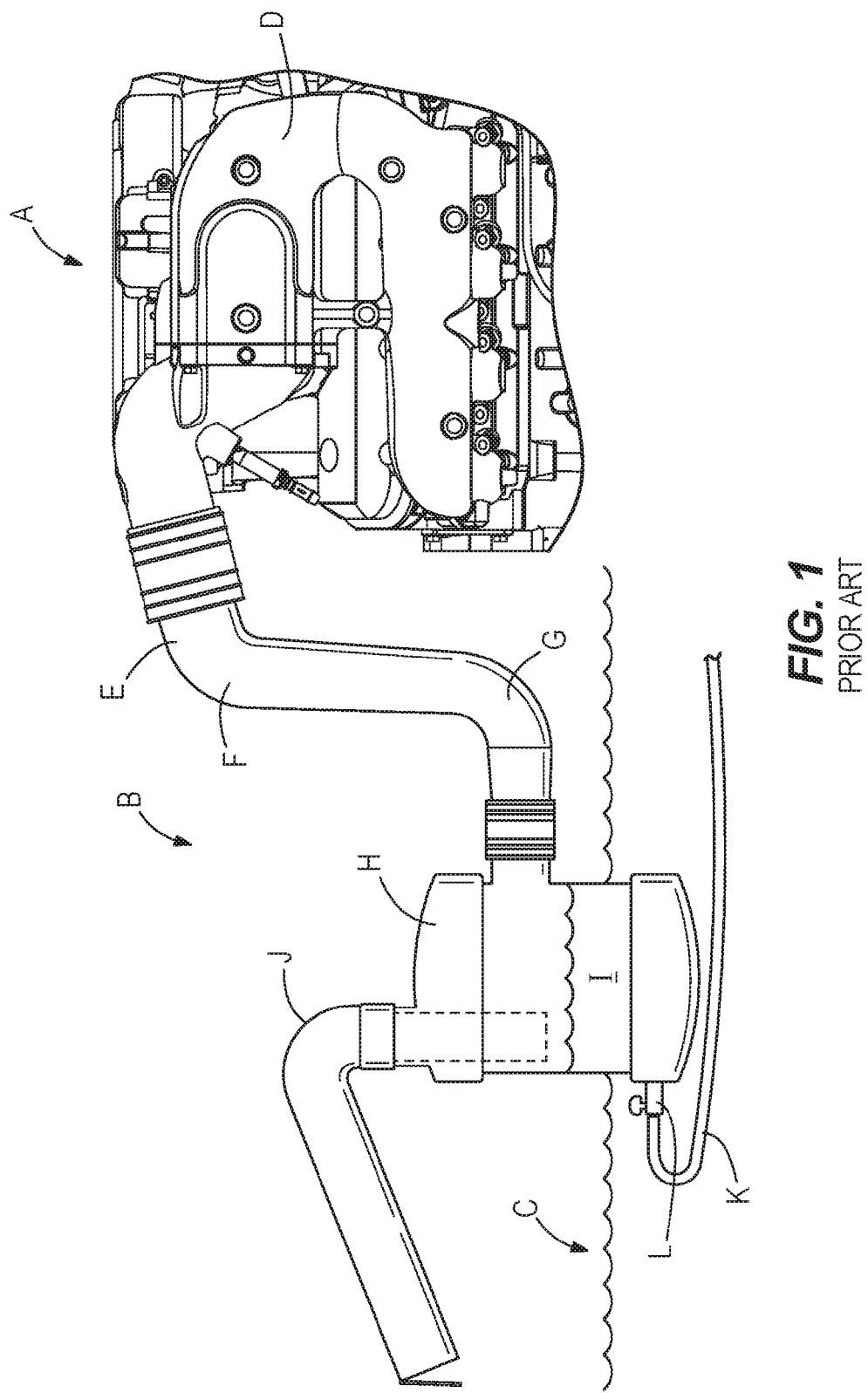
FIG. 1 depicts a prior art water lift muffler arrangement.

FIG. 1 illustrates one example of a prior art inboard combustion engine or stern drive A connected to a prior art water lift muffler B. The marine vessel in which the stern drive A and water lift muffler B are disposed is not shown. The surface of the body of water in which the marine vessel is situated is schematically shown at C. The stern drive A discharges exhaust gas via an exhaust manifold D connected to an aftwardly extending exhaust pipe E. The exhaust pipe E bends downwardly at bend F and then back horizontally at bend G. The exhaust pipe E discharges exhaust gas to a water lift canister H, which contains water I. As depicted, waterline C and waterline I may not always be at the same height. A discharge pipe J extends upwardly out of the water lift canister H and then angles downwardly and aftwardly to discharge exhaust gas via for example the transom or either side of the marine vessel. In this conventional arrangement, the water I in the water lift canister H dampens or otherwise quiets noise emanating from the stern drive A. A drain hose K is connected to the canister H and is configured to drain the water I from inside the canister H during periods of non use, for example during winter storage. A manual valve L is movable between open and close positions to control drainage from the water lift canister H via the drain hose K.

Through research and experimentation the present inventors have determined that the arrangement shown in FIG. 1 requires a significant amount of design space and is cumbersome to install and maintain, specifically in regards to positioning the stern drive A close to the transom of the marine vessel. The requirement to drain the canister H during periods of non use is also time consuming and inefficient. The present inventors have determined that it is desirable to provide more compact and efficient/effective water lift muffler and stern drive arrangements.

FIGS. 2-6 depict one example of an exhaust system 10 and a stern drive 12 according to the present disclosure. The stern drive 12 is configured to operate a conventional propulsor (not shown) such as a propeller, impeller and/or the like to thereby propel a marine vessel 14 in water 16. The type and configuration of the stern drive 12 can vary from that which is shown. In the illustrated example, the stern drive 12 includes an internal combustion engine 18, for example a diesel engine, which powers a drive shaft 20 into rotation about its own axis. The drive shaft 20 axially extends through a transom 22 of the marine vessel 14 and is operably connected to the noted propulsor. The exhaust system 10 includes an exhaust manifold 24 (and in this example an optional turbocharger) that conveys exhaust gas from the internal combustion engine 18 and an elongated exhaust conduit 26 that redirects the exhaust gas from the exhaust manifold 24 transversely with respect to the drive shaft 20, as shown at arrow 28 in FIGS. 3 and 5.

Figure 5:
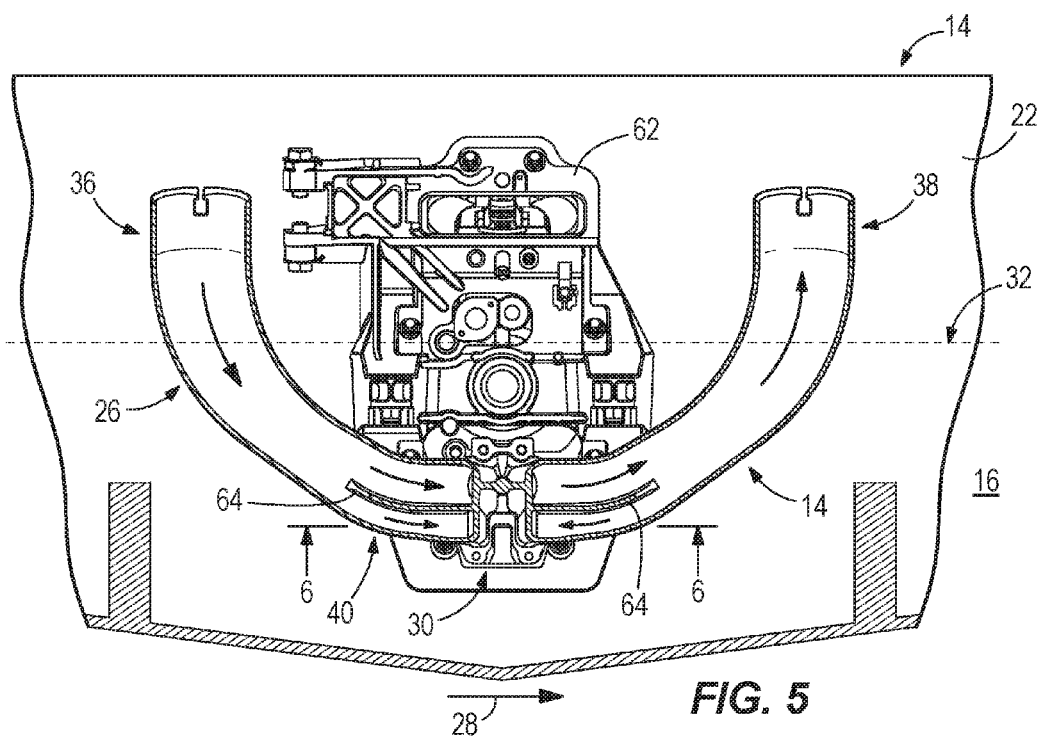
FIG. 5 is a view of section 5-5 taken in FIG. 2.

The elongated exhaust conduit 26 conveys the exhaust gas to an upstream exhaust outlet 30 that is configured to discharge the exhaust gas through the transom 22 at a location that is below the surface 32 of the water 16, and then to a downstream exhaust outlet 34 (see FIG. 2) that is configured to discharge the exhaust gas at a location that is above the surface 32 of the water 16. In the illustrated example, the downstream exhaust outlet 34 is configured to discharge the exhaust gas through the transom 22, however in other examples the downstream exhaust outlet 34 can be configured to discharge the exhaust gas through either side of the marine vessel. As shown in FIGS. 3 and 5, the elongated exhaust conduit 26 has a U-shape when viewed from inside the marine vessel 14 looking towards the transom 22. The elongated exhaust conduit 26 has an upstream portion 36, a downstream portion 38, and a curved intermediate portion 40 that is located between the upstream portion 36 and the downstream portion 38. The upstream portion 36 and downstream portion 38 are located vertically higher than the curved intermediate portion 40. The curved intermediate portion 40 is configured to be vertically lower than the surface 32 of the water 16. The elongated exhaust conduit 26 thus extends from the upstream exhaust outlet 30 to the downstream exhaust outlet 34 along a curved shape, when viewed inside the marine vessel 14 looking towards the transom 22, such as for example in FIGS. 3 and 5. As shown in FIGS. 1 and 5, the upstream exhaust outlet 30 is located vertically lower than the drive shaft 20 and the downstream exhaust outlet 34 is located vertically higher than the drive shaft 20.

Figure 2:
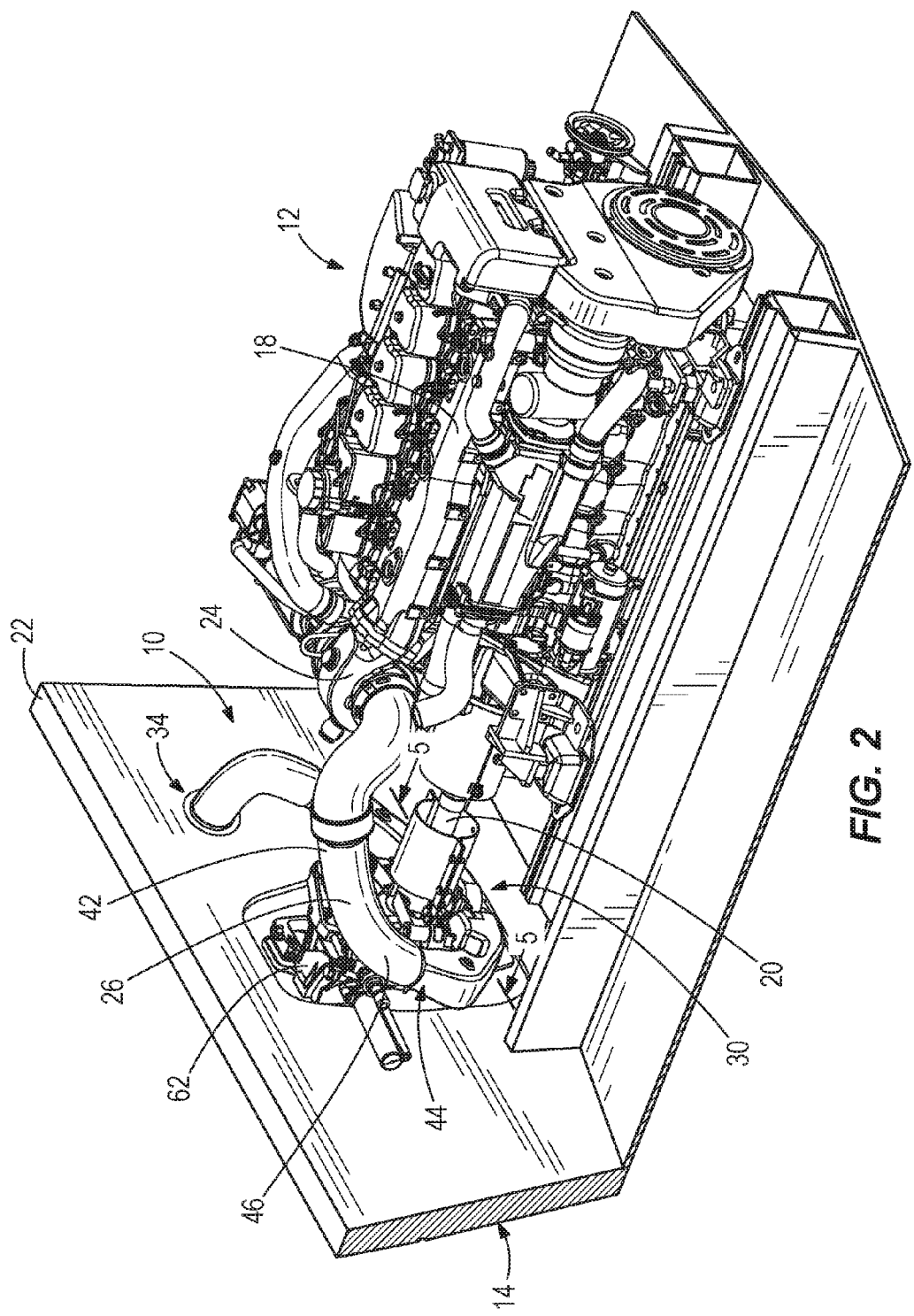
FIG. 2 depicts a stern drive and water lift exhaust system according to the present disclosure.
Figure 3:
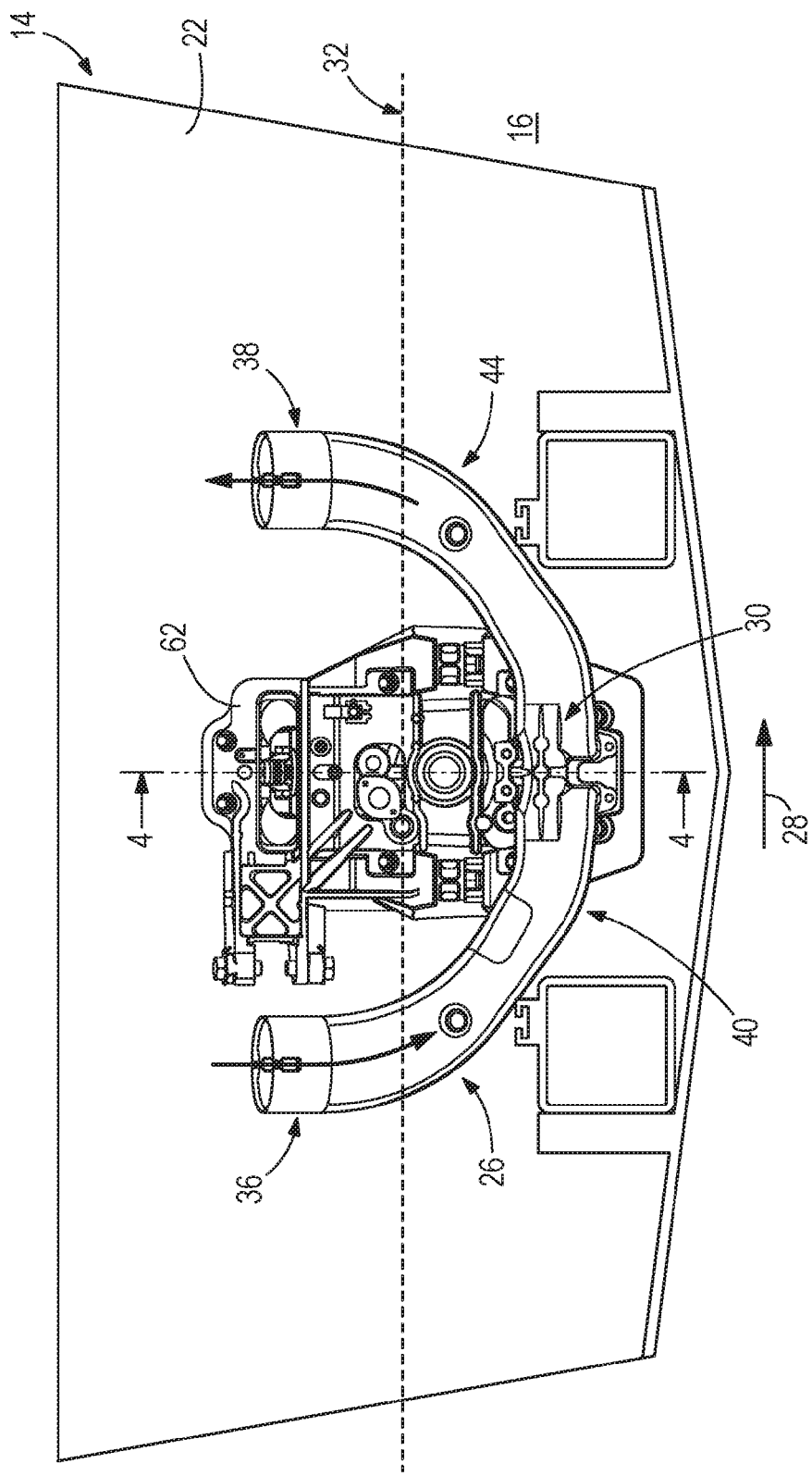
FIG. 3 is a view from inside the marine vessel looking towards the transom of the marine vessel, showing a portion of the water lift exhaust system.

As shown in FIG. 2, the elongated exhaust conduit 26 has a first axially extending portion 42 with respect to the drive shaft 20, a second transversely extending portion 44 with respect to the drive shaft 20, and an elbow 46 that connects the first axially extending portion 42 to the second transversely extending portion. The first axially extending portion 42 slopes vertically downwardly from a first end portion 48 located proximate to the exhaust manifold 24 to an opposite, second end portion located proximate to the transom 22.

Figure 4:
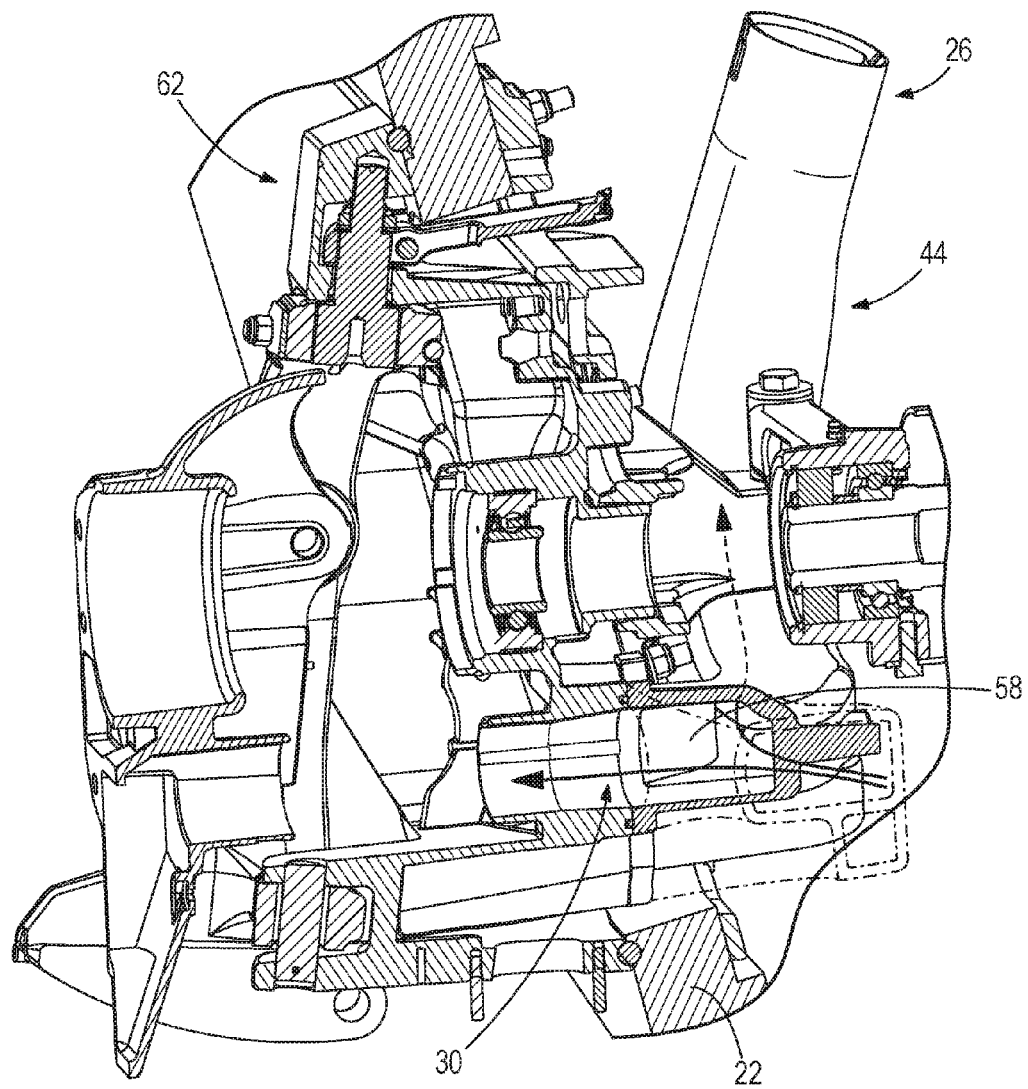
FIG. 4 is a view of section 4-4 taken in FIG. 3.
Figure 6:
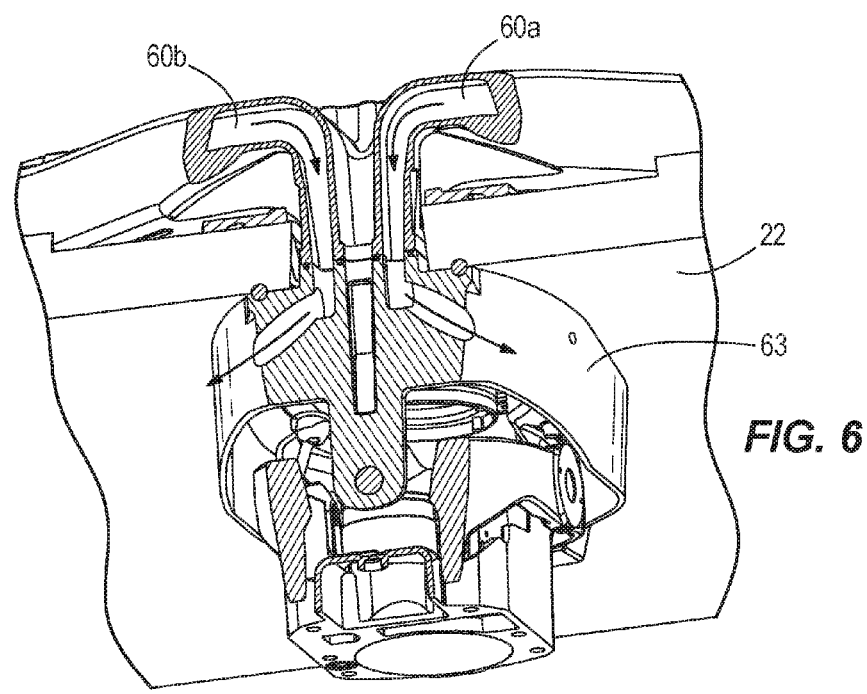
FIG. 6 is a view from outside the marine vessel, partially broken away, showing exhaust relief outlets.

Referring to FIGS. 4 and 6, respectively the first upstream exhaust outlet 30 has a first outlet passage 58 and second outlet passages 60a, 60b. The first outlet passage 58 is located vertically higher than the second outlet passages 60a, 60b and has a larger diameter than each of the second outlet passages 60a, 60b. In this example the second outlet passages 60a, 60b are considered to be a pair of opposing relief passages 60a, 60b, each having a smaller cross sectional diameter than the first outlet passage 58. In this example, the first outlet passage 58 extends through the transom 22 via the transom assembly 62 and is configured to discharge out of the propeller hub assembly (not shown) associated with the stern drive 12 at a location that is lower than the discharge locations of the second outlet passages 60a, 60b. The second outlet passages 60a, 60b extend through the transom assembly 62 and out of the gimbal or bell housing 63 on the outside of the transom 22.

Referring to FIG. 5, the elongated exhaust conduit 26 at the curved intermediate portion 40 has a pair of opposed separators or ribs 64 which are configured to separate water from the mixture of exhaust and water being conveyed through the elongated exhaust conduit 26. Water in the exhaust gas tends to settle by gravity and/or hug the outer diameter of the elongated exhaust conduit along the curved intermediate portion 40, thus separating the water out of the exhaust gas and into the lower passages shown in FIG. 5. The water thus drains out via the second outlet passages 60a, 60b.

In use, water that settles within the curved intermediate portion 40 provides a dampening and/or noise reducing effect on engine pulses from the internal combustion engine 18, which is similar in function to the prior art water lift exhaust system B including water lift canister H shown in FIG. 1; however taking up much less design space than the prior art. Advantageously, the downstream exhaust outline 34 is uniquely configured to discharge the exhaust gas through the marine vessel 14 at a height sufficient to cause an amount of water to collect in the curved intermediate portion 40 or U-shape when the marine vessel 14 is at rest or at low speed (i.e. non-planing) operation. In this manner, the elongated exhaust conduit 26 functions as an efficient/effective water lift muffler during operation of the stern drive 12. The axial distance between the stern drive 12 and the transom 22 can be reduced because of the omission of the prior art water lift canister H and the transverse orientation of the elongated exhaust conduit 26. The arrangement is advantageously configured to self drain when the stern drive 12 is out of use, thus eliminating the need for the drainage features K and L described herein above with reference to FIG. 1. The illustrated example allows for utilization of a smaller upstream exhaust outlet 30, which in conventional arrangements typically has not been large enough to support exhaust from larger displacement engines. The illustrated example includes an acceptable idle relief function at low engine speeds and provides acceptable noise reduction at high engine speeds, as well as acceptable engine exhaust back pressure levels, in a compact and self-draining configuration.

What is claimed is:

1. A stern drive for propelling a marine vessel in water, the stern drive configured to power a propulsor located below a surface of the water, the stern drive comprising:
an internal combustion engine that powers a driveshaft that is configured to axially extend through a transom of the marine vessel;
an exhaust manifold that is configured to convey exhaust gas away from the internal combustion engine; and
an elongated exhaust conduit that redirects the exhaust gas from the exhaust manifold transversely with respect to the driveshaft;
wherein the elongated exhaust conduit conveys the exhaust gas to an upstream exhaust outlet that is configured to discharge the exhaust gas through the transom below the surface of the water and then to a downstream exhaust outlet that is spaced apart from and located vertically higher than the upstream exhaust outlet, such that the elongated exhaust conduit retains water so as to function as a muffler during operation of the stern drive.

2. The stern drive according to claim 1, wherein the downstream exhaust outlet is configured to discharge the exhaust gas through the marine vessel at a location that is above the surface of the water.

3. The stern drive according to claim 1, wherein the downstream exhaust outlet is configured to discharge the exhaust gas through the transom of the marine vessel.

4. The stern drive according to claim 1, wherein the elongated exhaust conduit extends from the upstream exhaust outlet to the downstream exhaust outlet along a curved shape when viewed from inside the marine vessel looking towards the transom.

5. The stern drive according to claim 1, wherein the elongated exhaust conduit has a U-shape when viewed from the inside of the marine vessel looking towards the transom.

6. The stern drive according to claim 5, wherein the downstream exhaust outlet is configured to discharge the exhaust gas through the marine vessel at a location having a height sufficient to cause water to collect in the U-shape of the elongated exhaust conduit when the marine vessel is at rest or travelling at low speed in the water.

7. The stern drive according to claim 1, wherein the elongated exhaust conduit comprises an upstream portion, a downstream portion, and a curved intermediate portion that is located between the upstream portion and the downstream portion, wherein the upstream portion and downstream portion are located vertically higher than the curved intermediate portion, and wherein the curved intermediate portion is configured to be vertically lower than the surface of the water.

8. The stern drive according to claim 1, wherein the upstream exhaust outlet is located vertically lower than the driveshaft and wherein the downstream exhaust outlet is located vertically higher than the driveshaft.

9. The stern drive according to claim 1, wherein the elongated exhaust conduit comprises a first axially extending portion with respect to the driveshaft, a second transversely extending portion with respect to the driveshaft, and an elbow that connects the first axially extending portion to the second transversely extending portion.

10. The stern drive according to claim 9, wherein the first axially extending portion slopes vertically downwardly from a first end portion located proximate to the exhaust manifold to an opposite, second end portion located proximate to the transom.

11. The stern drive according to claim 10, wherein the second transversely extending portion has a U-shape when viewed from inside the marine vessel looking towards the transom.

12. The stern drive according to claim 11, wherein the second transversely extending portion comprises an upstream portion, a downstream portion, and an intermediate portion located between the upstream portion and the downstream portion, wherein the upstream portion and the downstream portion are located vertically higher than the intermediate portion, and wherein the intermediate portion is configured to be located vertically lower than the surface of the water.

13. The stern drive according to claim 1, wherein the upstream exhaust outlet comprises first and second outlet passages, wherein the first outlet passage is located vertically higher than the second outlet passage.

14. An exhaust system for a stern drive that propels a marine vessel in water, the stern drive configured to power a propulsor located below a surface of the water, the exhaust system comprising:
an exhaust manifold that is configured to convey exhaust gas from an internal combustion engine that powers a driveshaft axially extends through a transom of the marine vessel; and
an elongated exhaust conduit that redirects the exhaust gas from the exhaust manifold transversely with respect to the driveshaft;
wherein the elongated exhaust conduit conveys the exhaust gas to an upstream exhaust outlet configured to discharge the exhaust gas through the transom below the surface of the water and then to a downstream exhaust outlet that is spaced apart from and is located vertically higher than the upstream exhaust outlet, such that the elongated exhaust conduit retains water so as to function as a muffler during operation of the stern drive.

15. The exhaust system according to claim 14, wherein the downstream outlet is configured discharge the exhaust gas above the surface of the water.

16. The exhaust system according to claim 14, wherein the elongated exhaust conduit extends from the upstream outlet to the downstream outlet along a curved shape when viewed from inside the marine vessel looking towards the transom.

17. The exhaust system according to claim 14, wherein the elongated exhaust conduit has a U-shape when viewed from the inside of the marine vessel looking towards the transom.

18. The stern drive according to claim 17, wherein the downstream exhaust outlet is configured to discharge the exhaust gas through the marine vessel at a location having a height sufficient to cause water to collect in the U-shape of the elongated exhaust conduit when the marine vessel is at rest or travelling at low speed.

19. The exhaust system according to claim 14, wherein the elongated exhaust conduit comprises an upstream portion, a downstream portion, and a curved intermediate portion located between the upstream portion and the downstream portion, wherein the upstream portion and downstream portion are located vertically higher than the curved intermediate portion, and wherein the curved intermediate portion is configured to be vertically lower than the surface of the water.

20. The exhaust system according to claim 14, wherein the upstream exhaust outlet is located vertically lower than the driveshaft and wherein the downstream exhaust outlet is located vertically higher than the driveshaft.

* * * * *